(12) United States Patent
Komatsu et al.

(10) Patent No.: US 7,505,249 B2
(45) Date of Patent: Mar. 17, 2009

(54) ELECTRONIC COMPONENT

(75) Inventors: Takashi Komatsu, Tokyo (JP); Kouji Tanabe, Tokyo (JP)

(73) Assignee: TDK Corporation, Tokyo (JP)

( * ) Notice: Subject to any disclaimer, the term of this patent is extended or adjusted under 35 U.S.C. 154(b) by 195 days.

(21) Appl. No.: 11/709,688

(22) Filed: Feb. 23, 2007

(65) Prior Publication Data

US 2007/0201183 A1 Aug. 30, 2007

(30) Foreign Application Priority Data

Feb. 28, 2006 (JP) .............................. 2006-053920

(51) Int. Cl.
*H01G 4/06* (2006.01)
(52) U.S. Cl. .............. 361/321.1; 361/321.2; 361/321.4; 361/311; 361/313; 361/306.1; 501/137; 501/138; 501/139
(58) Field of Classification Search .............. 361/321.1, 361/321.2, 321.4, 311–313, 302–305, 306.1, 361/306.3; 501/137–139
See application file for complete search history.

(56) References Cited

U.S. PATENT DOCUMENTS

| 5,805,409 | A | | 9/1998 | Takahara et al. |
| 6,002,577 | A | * | 12/1999 | Wada et al. ................. 361/312 |
| 6,522,521 | B2 | * | 2/2003 | Mizuno et al. ............ 361/321.4 |
| 6,699,809 | B2 | * | 3/2004 | Fujikawa et al. ............ 501/138 |
| 6,829,137 | B2 | * | 12/2004 | Konaka et al. ............ 361/321.4 |
| 6,930,876 | B1 | * | 8/2005 | Noguchi et al. ............. 361/311 |
| 7,046,502 | B2 | * | 5/2006 | Murosawa et al. ....... 361/321.2 |
| 2006/0044098 | A1 | | 3/2006 | Kimura et al. |

FOREIGN PATENT DOCUMENTS

| EP | 1 571 680 A | 9/2005 |
| JP | A 11-219849 | 8/1999 |
| JP | A-2005-51226 | 2/2005 |
| KR | 1996-0037716 A | 11/1996 |
| WO | WO 94/10697 A | 5/1994 |
| WO | WO 2004/053901 A1 | 6/2004 |

* cited by examiner

*Primary Examiner*—Nguyen T Ha
(74) *Attorney, Agent, or Firm*—Oliff & Berridge, PLC

(57) ABSTRACT

The present invention aims to provide an electronic component capable of reducing the occurrence of cracks at the joining portion to a board etc. A capacitor 1 (laminated ceramic capacitor) being one example of the electronic component is provided with an element assembly 10 (ceramic) and a pair of external electrodes 20 formed on both side surfaces of the element assembly 10. In the element assembly 10, a dielectric layer 12 and an internal electrode 14 are laminated alternately. The external electrode 20 has such constitution that a first electrode layer connected with the internal electrode, a second electrode layer (electroconductive resin layer) including a hardened product of thermohardening resin containing a polyphenol compound having a side chain composed of an aliphatic group, a third electrode layer composed of Ni and a fourth electrode layer composed of Sn are formed in this order from the element assembly side.

5 Claims, 1 Drawing Sheet

ELECTRONIC COMPONENT

BACKGROUND OF THE INVENTION

1. Field of the Invention

The present invention relates to an electronic component, in particular to an electronic component using a ceramic material.

2. Related Background of the Invention

Many of electronic components such as a capacitor and inductor using a ceramic material have constitution that is provided with an element assembly composed of a ceramic material, an internal electrode provided inside the element assembly, and an external electrode provided on the surface of the element assembly so as to be connected with the internal electrode. For the electronic components, conventionally, methods have been studied for inhibiting cracks etc. of the element assembly that occur due to the difference between physical properties of the element assembly and the external electrode.

For example, JP-A-11-219849 describes that, in a laminated ceramic capacitor being an example of the electronic component having the aforementioned structure, an external electrode is given a three-layer structure provided with a first to third electroconductive layers from the element assembly side, wherein a layer including a resin component is provided as a second electroconductive layer and joining strength between respective layers is set in a predetermined range. In the laminated ceramic capacitor, due to the absorption of external force by the second electroconductive layer, etc., cracks in the element assembly tend to occur hardly.

SUMMARY OF THE INVENTION

Such electronic components as described above are used while being mounted on a board such as a printed-wiring board. In this case, generally, by soldering the external electrode to a terminal portion on the board, the electronic component is electrically connected with a circuit etc. provided on the board and, simultaneously, fixed on the board.

However, the result of the study by the present inventors revealed that, when thermal shock is added to a board on which the electronic component has been mounted etc., since the board and the electronic component have large difference in the degree of expansion and contraction by heat, stress concentrates at the soldered joining portion of them to lead to easy occurrence of cracks. Further, the occurrence of the crack at the joining portion could not sufficiently been inhibited often even when such laminated ceramic capacitor as described in the conventional document, in which the occurrence of the crack in an element assembly is reduced, was applied.

Accordingly, the present invention has been accomplished with the view of the circumstance, and aims to provide an electronic component capable of reducing the occurrence of cracks at a joining portion with a board etc. The present invention also aims to provide a method for manufacturing the electronic component.

In order to achieve the above-described purpose, the electronic component of the present invention is provided with a ceramic element assembly, an internal electrode provided inside the ceramic element assembly, an external electrode provided on the surface of the ceramic element assembly and electrically connected with the internal electrode, wherein the external electrode has an electroconductive resin layer including a hardened product of a thermohardening resin containing a polyphenol compound having a side chain composed of an aliphatic group.

The polyphenol compound included in the thermohardening resin functions mainly as a hardening agent, and forms, upon the hardening, a cross-linked structure that links respective polymerization structures composed of the base compound of the thermohardening resin. In the present invention, since the polyphenol compound has a side chain composed of an aliphatic group, the cross-linked structure formed by the polyphenol compound also has the same side chain. Consequently, in the hardened product of the thermohardening resin, the cross-linked structures are to be formed in a state separated from one another to some extent caused by the steric hindrance of the side chains. As the result, the hardened product has a low cross-link density and is flexible, and the electroconductive resin layer including the hardened product can be flexible, too. Then, even when stress is added to the joining portion when the external electrode is joined onto the board, such flexible electroconductive resin layer can relax the stress. Therefore, the electronic component of the present invention hardly allows cracks to occur at the joining portion with a board even when it is subjected to thermal shock in the state of being mounted on the board In the electronic component of the present invention, the aliphatic group is preferably an alkyl group. With a polyphenol compound having a side chain composed of an all group, the hardened product becomes further flexible. In particular, alkyl groups having 4 or more carbon atoms result in extremely superior flexbility.

Further, the thermohardening resin preferably includes, additionally, an epoxy compound having plural epoxy groups. In this case, the epoxy compound preferably functions mainly as the base compound of the thermohardening resin. An electroconductive resin layer including the hardened product of such thermohardening resin has reasonable strength as well as excellent adhesiveness with adjacent layer, thereby making it possible to reduce abrasion of the external electrode from the element assembly, or abrasion of layers constituting the external electrode from each other, and to enhance reliability of the electronic component.

More specifically, the polyphenol compound is preferred when it is a compound shown by general formula (1a) or (1b) bellow. The polyphenol compound having such structure can satisfactorily form a cross-linked structure and, additionally, tends to form a flexible hardened product by a side chain represented by $R^{11}$, $R^{17}$ or the like.

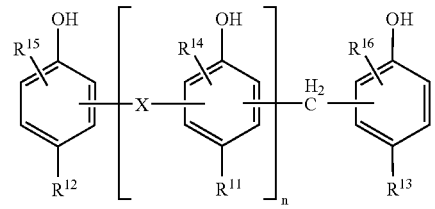

(1a)

-continued

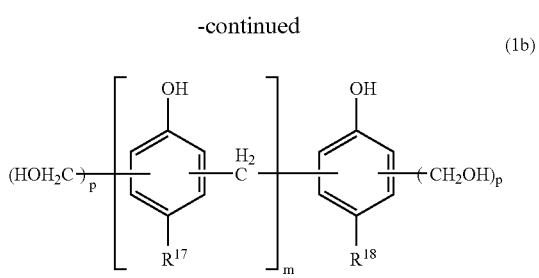

[In the formula (1a), $R^{11}$ represents an alkyl group having 4 or more carbon atoms, $R^{12}$ and $R^{13}$ each independently represents a hydrogen atom or an alkyl group, $R^{14}$, $R^{15}$ and $R^{16}$ each independently represents an hydrogen atom or a methyl group, X represents a group shown by a chemical formula (2a), (2b), (2c) or (2d) below, and n is 0 or an integer of 1-10:

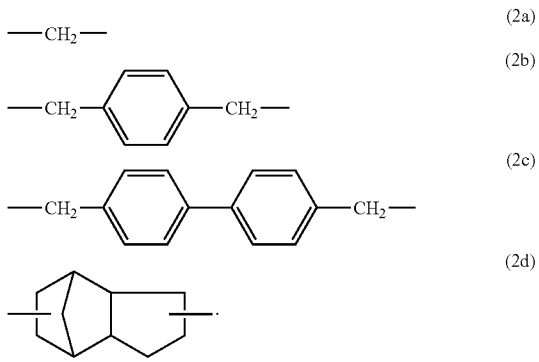

In the formula (1b), $R^{17}$ represents an alkyl group having 4 or more carbon atoms, $R^{18}$ represents a hydrogen atom or an alkyl group, m is 0 or an integer of 1-10, and p is 0 or an integer of 1-2.]

The above-described electronic component of the present invention can be suitably manufactured, for example, by the following method. That is, it is a method for manufacturing an electronic component provided with a ceramic element assembly, an internal electrode provided inside the ceramic element assembly, and an external electrode provided on the surface of the ceramic element assembly and electrically connected with the internal electrode, wherein the external electrode has an electroconductive resin layer, which is formed by hardening a thermohardening resin containing a polyphenol compound having a side chain composed of an aliphatic group as a hardening agent.

DESCRIPTION OF THE PREFERRED EMBODIMENTS

Figure 1:
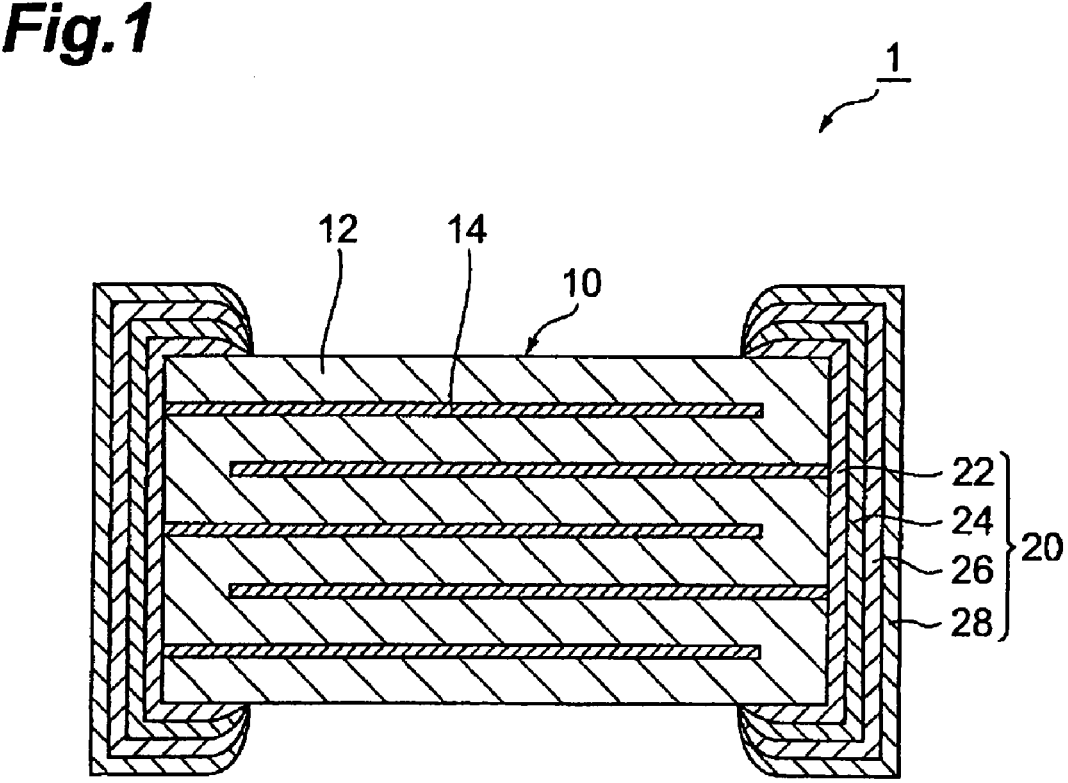
FIG. 1 is a drawing that schematically illustrates a cross-sectional constitution of the laminated ceramic capacitor according to a suitable embodiment

Hereinafter, suitable embodiments of the present invention will be described while referring to the drawing. However, the present invention is not necessarily limited to the dimension ratio in the drawing. In the description below, a laminated ceramic capacitor is described as one example of the electronic component.

FIG. 1 is a drawing that schematically shows the cross-sectional constitution of the laminated ceramic capacitor (herein, simply referred to as the "capacitor") according to a suitable embodiment. The shown capacitor 1 is constituted of an element assembly (ceramic element assembly) 10 and a pair of external electrodes 20 formed on both side surfaces of the element assembly 10.

In the element assembly 10, a dielectric layer 12 and an internal electrode 14 are alternately laminated so that the dielectric layer 12 is arranged on both outsides. Here, practically, respective adjacent dielectric layers 12 are unified in such degree that the boundary thereof can not be viewed. The internal electrode 14 is provided so that the only one end is exposed to the end face of the element assembly 10 on which an external electrode 20 is formed. The plural (here, five) internal electrodes 14 arranged within the element assembly 10 are arranged so that the above-described end is alternately exposed to the facing end ace of the element assembly 10 approximately parallel.

The dielectric layer 12 is constituted of a dielectric material including a ceramic material. As the ceramic material included in the dielectric material in order to obtain excellent properties as a capacitor, a material having a high permittivity is preferred. For example, barium titanate ($BaTiO_3$)-based materials, Pb-containing complex perovskite compound-based materials, and strontium titanate ($SrTiO_3$)-based materials are suitable.

As the internal electrode 14, for example, one composed of Ni or Ni alloy can be mentioned. As the Ni alloy, one containing 95% by mass or more of Ni, and at least one of Mb, Cr, Co, Al etc. is preferred.

The external electrode 20 is parallel to the lamination direction of the dielectric layer 12 and internal electrode 14 in the element assembly 10, and is formed on each of two end faces facing to each other. The external electrode 20 has a 4-layer construction provided with a first electrode layer 22, a second electrode layer 24, a third electrode layer 26 and a fourth electrode layer 28, in this order from the element assembly 10 side.

The first electrode layer 22 is provided in close contact with the element assembly 10 and connected with the internal electrode 14 drawn to the end face of the element assembly 10. The first electrode layer 22 is composed of a metal material having a good electric connection with the internal electrode 14. As the metal material, Ag and Cu are preferred.

The second electrode layer 24 is an electroconductive resin layer including a Ted product of a thermohardening resin (hereinafter, simply abbreviated as the "resin hardened product") and electroconductive material. The second electrode layer 24 is mainly constituted of grins of an electroconductive material etc., and has a cons on in which voids between the gains are filled with the resin hardened product. As the electroconductive material included in the second electrode layer 24, Ag is preferred.

In the second electrode layer 24, the percentage of electroconductive material/resin hardened product is, min mass ratio, preferably 95/5-70/30, more preferably 90/10-80/20. In the total mass of the electroconductive material and resin hardened product, the electroconductive material content of less than 70% by mass may result in an insufficient conductivity of the second electrode layer 24. On the other hand, the content of more than 95% by mass tends to result in a relatively too small resin hardened product content, and insufficient flexibility and adhesiveness of the second electrode layer 24.

There is no particular limitation on the thermohardening resin for forming the resin hardened product provided that it includes a polyphenol compound having a side chain composed of an aliphatic group. Preferable examples of the thermohardening resin include epoxy compounds having plural epoxy groups, and those including a polyphenol compound having a side chain composed of an aliphatic group. In this case, it is more preferred that the epoxy compound functions as a base compound and the polyphenol compound functions as a hardening agent. As the epoxy compound, linear bifunctional epoxy compounds having an epoxy group at both ends are preferred. Specifically, bisphenol type epoxy resin is preferred, wherein such compounds as represented by the general formula (3) below can be exemplified. For example, bisphenol-A type epoxy resin, bisphenol-F type epoxy resin, bisphenol-S type epoxy resin etc. are suitable:

polyphenol compound is constituted of a main chain composed of plural phenols that are bound via a predetermined lining group, and a side chain composed of an aliphatic group and bound to the main chain. The aliphatic group being the side chain may be bonded to any portion of the main chain, but, from the view point of easiness of synthesis, it is preferably bonded to the benzene ring of phenol constituting the main chain, and more preferably bonded at the para site relative to a phenolic hydroxyl group.

The aliphatic group constituting the side chain is a group constituted mainly of hydrocarbon, and may include partially an ether bond, ester bond, carbonyl bond, amide bond, uremia bond etc. in the structure thereof.

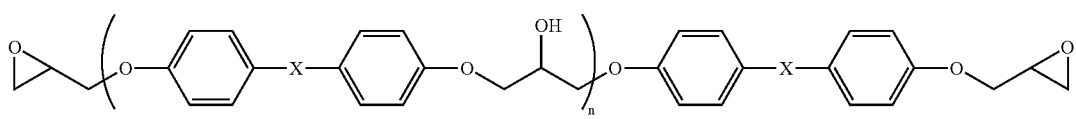

(3)

In the formula, X is a divalent group represented by the chemical formulae (4a)-(4e) below, and n is an integer of 4 or more:

 (4a)

 (4b)

 (4c)

 (4d)

 (4e)

As the epoxy compound, one having molecular weight of 2000 or more is preferred, and one having molecular weight of 3000 or more is more preferred. But, when an epoxy compound has molecular weight of 10000 or more, since there may occur such disadvantage that the adhesiveness of the second electrode layer 24 with the first or third electrode layer 22, 26 degrades, the upper limit of the molecular weight of the epoxy compound is preferably set to around 10000. Here, the "molecular weight" means an average molecular weight. Specifically, the value of a number average molecular weight measured by gel permeation chromatography can be applied.

An epoxy compound having molecular weight of 2000 or more is, in other words, a compound having such molecular chain with length that gives molecular weight of 2000 or more. Specifically, when the epoxy compound is a compound represented by the above-described general formula (1), n in the formula is preferably 5 or more, more preferably 6-20, further preferably 6-15.

The hardened product of a thermohardening resin including an epoxy compound having molecular weight of 2000 or more becomes flexible, because the base compound has a long molecular chain to give a reasonably lessened cross-linked structure. Consequently, the incorporation of an epoxy compound having molecular weight of 2000 or more leads to give a resin hardened product excellent in flexibility due to a synergistic effect with the polyphenol compound described later.

The polyphenol compound having a side chain composed of an aliphatic group included in the thermohardening resin can function, as described above, as a hardening agent. The As the aliphatic group, an alkyl group is preferred. The alkyl group includes both of linear and branched ones, and a linear alkyl group is particularly suitable because it can enhance more the flexibility of the resin hardened product. The alkyl group has preferably 4 or more carbon atoms, more preferably 4-20 carbon atoms, further preferably 4-12 carbon atoms, furthermore preferably 4-8 carbon atoms. An alkyl group having 4 or more carbon atoms can lead to give a more flexible resin hardened product. On the other hand, the synthesis of polyphenol having the alkyl group including more than 20 carbon atoms tends to be difficult.

As the above-described polyphenol compound, novolac type phenol resin or resole type phenol resin is preferred. As the novolac type phenol resin, compounds represented by the above-described general formula (1a) can be mentioned. In the compound represented by the formula (1a), preferably each of $R^{11}$, $R^{12}$ and $R^{13}$ is the same alkyl group, wherein the suitable alkyl group includes such ones as described above. As the group represented by X, a methylene group represented by the above-described general formula (2a) is preferred. In addition, n is preferably 0 or an integer of 1-10.

As the resole type phenol resin, compounds represented by the above-described general formula (1b) can be mentioned. In the compound represented by the formula (1b), preferably $R^{17}$ and $R^{18}$ are the same alkyl group, wherein the suitable alkyl group includes such ones as described above. m is preferably 0 or an integer of 1-10. In addition, p is preferably 0-2.

When the thermohardening resin includes the above-described epoxy compound and polyphenol compound, these have been preferably blended so that epoxy compound/polyphenol compound gives 50/50-95/5 in mass ratio. In the total mass of the epoxy compound and the polyphenol compound, when the epoxy compound content is less than 50% by mass, the elasticity of the resin hardened product is heightened too much, thereby making it difficult to give the above-described second electrode layer 24 excellent in stress relaxation property. On the other hand, when the content exceeds 95% by mass, unreacted epoxy groups in the resin hardened product increase to absorb moisture easily, and thus sometimes the adhesiveness with the adjacent layer lowers. Form the viewpoint of obtaining the second electrode layer 24 having good stress relaxation property and adhesiveness, the above-described epoxy compound content is more preferably 60-90% by mass.

The second electrode layer 24 is constituted of the hardened product of the thermohardening resin. The resin hardened product has a three-dimensionally cross-linked structure mainly constituted of a chain-like polymerization structure constituted of the base compound or polymer thereof, and a cross-linked structure formed by the polyphenol compound so as to link two or more polymeric structures. The cross-linked structure is mainly formed by the generation of a bond resulted from the reaction of an active group (an epoxy group when the base compound is an epoxy compound) in the chain-shaped polymerization structure and a hydroxyl group in the polyphenol compound.

The third electrode layer 26 is a metal layer formed so as to cover the surface of the second electrode layer 24. For example, a layer constituted of Ni can be mentioned. The fourth electrode layer 28 is a metal layer formed so as to cover further the surface of the third electrode layer 26. For example, a layer constituted of Sn can be mentioned. These third and fourth electrode layers 26, 28 serve to result in good electric connection between the external electrode 20 and a terminal etc. on the board. Further, they allow the ex electrode 20 to be soldered to a terminal etc. on the board.

Next, a suitable method for manufacturing the capacitor 1 having the above-described constitution will be described.

Firstly, a raw material for dielectric material to constitute the dielectric layer 12 is prepared. For example, as the raw material for the ceramic material, oxides etc. of respective metal elements to constitute the ceramic material can be mentioned. After mixing the raw material, it is provisionally calcined at around 800-1300° C. The provisionally calcined product is pulverized until it has an intended grain diameter with a jet mill, ball mill etc. Then, to the pulverized product, a binder, plasticizer etc. are added to give a paste for forming the dielectric layer 12 hereinafter, referred to as the "dielectric paste").

Further, powder of metal or alloy to constitute the internal electrode 14 are mixed with a binder, solvent etc. to prepare a paste for forming the internal electrode layer 14 (hereinafter, referred to as the "internal electrode paste").

Then, by coating alternately the dielectric paste and the internal electrode paste, a laminated body, in which the dielectric paste layer and the internal electrode paste layer are laminated alternately, is obtained. The laminated body is then cut into an intended size according to need, and subjected to treatment for removing the binder (debinder) in respective paste layers by heating etc. After that, the laminated body is normally calcined under an inert gas atmosphere such as $N_2$ or $H_2$ at 1200-1400° C. to give the element assembly 10. By such normal calcination, the dielectric paste layer and the internal electrode paste layer are converted into the dielectric layer 12 and the internal electrode 14, respectively.

After that, onto two end faces on which the end of the internal electrode 14 is exposed in the element assembly 10, such metal as Ag to constitute the first electrode layer 22 is baked to form the first electrode layer 22 on the surface of the end face. Specifically, for example, the first electrode layer 22 can be formed by coating an electroconductive paste prepared by adding a binder etc. to metal on the end face, and then calcining the same at a temperature of around 800° C.

Next, an electroconductive paste (electroconductive resin material) including an electroconductive material and thermohardening resin to form the above-described second electrode layer 24 is coated so as to cover the first electrode layer 22. After the coating, it is heated at around 150-250° C. to harden the thermohardening resin in the electroconductive paste, thereby forming the second electrode layer 24 on the surface of the first electrode layer 22.

Further, by such wet plating method as electrolytic plating, the third electrode layer 26 composed of Ni etc. is formed so as to cover the second electrode layer 24. Then, on the surface of the third electrode layer 26, the fourth electrode layer 28 composed of Sn etc. is formed in the same way. In this way, the capacitor 1 having the structure shown in FIG. 1 can be obtained.

The capacitor 1 having such constitution as described above is provided with the reasonably flexible second electrode layer 24 as described above in the external electrode. In the case where the capacitor 1 is fixed to the board etc. trough the soldering etc. of the external electrode 20, since there is large difference, usually, in thermal volume change between the capacitor 1 and the board etc., when it is subjected to thermal shock, stress tends to concentrate on the portion where they are joined with soldering. In reality, in the capacitor 1, such stress can be sufficiently relaxed by the flexible second electrode layer 24 in the external electrode 20. Consequently, even when the above-described stress occurs by thermal shock etc., cracks hardly occur at the joining portion (soldered portion) of the capacitor 1 and the board.

The electronic component of the present invention is not limited to the laminated ceramic capacitor (capacitor 1) of the above-described embodiment. For example, firstly, the capacitor 1 is sufficient when it is provided with at least an electroconductive resin layer corresponding to the second electrode layer 24 as the external electrode 20. In other words, the external electrode 20 may be constituted of the second electrode layer 24 alone, or have a layered structure including more than four layers as described above. Further, when the external electrode 20 is constituted of plural layers, the forming position of the second electrode layer 24 (electroconductive resin layer) is not limited to the second layer from the element assembly 10 side. But, from the viewpoint of conducting satisfactorily the soldering etc. of the external electrode 20, the outermost layer of the external electrode 20 is preferably a metal layer of Sn etc., which is advantageous to the soldering, instead of the second electrode layer 24.

In addition, the electronic component of the present invention is not limited to the above-described laminated ceramic capacitor. It is not particularly limited when it is a ceramic electronic component having a structure provided with an external electrode on the surface of the ceramic element assembly. As the ceramic electronic component, a piezoelectric element, inductor, varistor, thermistor etc. can be mentioned.

EXAMPLES

The present invention will be described in further detail on the basis of Examples, but the present invention is not limited to these Examples.

[Manufacture of Capacitor]

Example 1

Firstly, an element assembly, in which a dielectric layer composed of barium titanate and an internal electrode layer composed of nickel were arranged so that the dielectric layer lied on both outsides, was prepared. Next on a pair of end faces facing to each other in the element assembly, an electroconductive paste containing Cu, glass frit and ethyl cellulose as an organic binder was coated, which was then calcined at 800° C. to form a first electrode layer on both end faces of the element assembly.

Next, on the surface of the first electrode layer, an electroconductive paste, which included 35% by weight of granular Ag powder having an average grain diameter of 1 μm, 35% by weight of flake-shaped Ag powder having an average grain diameter of 10 μm, 8% by weight of bisphenol-A type epoxy resin (base compound), 4% by weight of novolac type phenol resin (hardening agent), and 18% by weight of butylcarbitol (solvent), was coated. Incidentally, in the present Example, as the novolac type phenol resin, specifically, a resin, in which each of $R^{11}$-$R^{13}$ was an octyl group, each of $R^{14}$-$R^{16}$ was a hydrogen atom, X was a methylene group and n was 2 in the above-described formula (1a), was used.

Next, the electroconductive paste was heated at 200° C. for 60 minutes to be hardened, thereby forming a second electrode layer on the first electrode layer. After that, on the surface of the second electrode layer, a Ni-plated layer and a Sn-plated layer were formed sequentially by an electrolytic plating method to form a third electrode layer and a fourth electrode layer, respectively, to complete a capacitor provided with an external electrode of a four-layer structure on both end faces of the element assembly.

Example 2

A capacitor was obtained in the same way as in Example 1, except for using a novolac type phenol resin having the same structure except that each of $R^{11}$-$R^{13}$ was a butyl group in the above-described formula (1a), as a hardening agent in the electroconductive paste.

Example 3

A capacitor was obtained in the same way as in Example 1, except for using a novolac type phenol resin having the same structure except that each of $R^{11}$-$R^{13}$ was a methyl group in the above-described formula (1a), as a hardening agent in the electroconductive paste.

Example 4

A capacitor was obtained in the same way as in Example 1, except for using a novolac type phenol resin having the same structure except that each of $R^{11}$-$R^{13}$ was an ethyl group in the above-described formula (1a), as a hardening agent in the electroconductive paste.

Example 5

A capacitor was obtained in the same way as in Example 1, except for using a novolac type phenol resin having the same structure except that each of $R^{11}$-$R^{13}$ was a propyl group in the above-described formula (1a), as a hardening agent in the electroconductive paste.

Example 6

A capacitor was obtained in the same way as in Example 1, except for using a resole type phenol resin in which each of $R^{17}$-$R^{18}$ was an octyl group, p was 2 and n was 2 in the above-described formula (1b), as a hardening agent in the electroconductive paste.

Comparative Example 1

A capacitor was obtained in the same way as in Example 1, except for using a novolac type phenol resin having the same structure except that each of $R^{11}$-$R^{13}$ was a hydrogen atom in the above-described formula (1a), as a hardening agent in the electroconductive paste.

[Thermal Shock-Test]

Samples, in which respective capacitor elements in Examples 1-6 and Comparative Example 1 were fixed on a board by soldering the external electrode, were prepared. The samples were subjected to thermal shock test, in which thermal shock consisting of cooling at −55° C. for 30 minutes and heating at 125° C. for 30 minutes as one cycle was added in a predetermined number of cycles. After such test, whether or not cracks occurred at the soldered portion was checked. The thermal shock test was carried out under respective conditions including 1000, 2000 and 3000 cycles of the thermal shock. In the thermal shock test 50 samples from respective Examples and Comparative Example were used and, among 50 samples, the number of samples in which the occurrence of cracks was observed was counted. It was defined as crack-occurring sample number. The obtained results are shown in Table 1.

TABLE 1

| | Crack-occurring sample number | | |
|---|---|---|---|
| | Thermal shock 1000 cycles | Thermal shock 2000 cycles | Thermal shock 3000 cycles |
| Example 1 | 0 | 0 | 0 |
| Example 2 | 0 | 0 | 0 |
| Example 3 | 0 | 2 | 5 |
| Example 4 | 0 | 1 | 3 |
| Example 5 | 0 | 0 | 2 |
| Example 6 | 0 | 0 | 0 |
| Comp. Ex. 1 | 1 | 4 | 9 |

From the Table 1, it was confirmed that capacitors in Examples 1-6 hardly generate cracks etc. at the soldered portion even when they are mounted on the board by soldering of the external electrode and subjected to thermal shock, as compared with the capacitor in Comparative Example 1.

As described above, in the electronic component according to the present invention, even when it is subjected to thermal shock in such state as has been joined to the board etc. by soldering of the external electrode, stress added to the joining portion to the board etc. can be relaxed to make it possible to reduce the occurrence of cracks at the joining portion. In addition, according to the present invention, it also becomes possible to provide a method for manufacturing suitably such electronic component.

What is claimed is:

1. An electronic component comprising:
   a ceramic element assembly;
   an internal electrode provided inside the ceramic element assembly; and
   an external electrode provided on the surface of the ceramic element assembly and electrically connected with the internal electrode, wherein:
   the external electrode has an electroconductive resin layer including a hardened product of thermohardening resin containing a polyphenol compound having a side chain composed of an aliphatic group.

2. The electronic component according to claim 1, wherein the aliphatic group is an alkyl group.

3. The electronic component according to claim 2, wherein the alkyl group has 4 or more carbon atoms.

4. The electronic component according to claim 1, wherein the thermohardening resin ether contains an epoxy compound having plural epoxy groups.

5. The electronic component according to claim 1, wherein the polyphenol compound is a compound represented by the general formula (1a) or (1b) below:

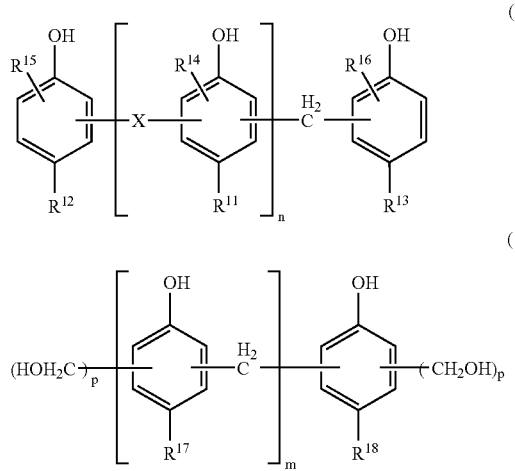

[in the formula (1a), $R^{11}$ represents an alkyl group having 4 or more carbon atoms, $R^{12}$ and $R^{13}$ each independently represents a hydrogen atom or an alkyl group, $R^{14}$, $R^{15}$ and $R^{16}$ each independently represents an hydrogen atom or a methyl group, X represents a group shown by a chemical formula (2a), (2b), (2c) or (2d) below, and n is 0 or an integer of 1-10;

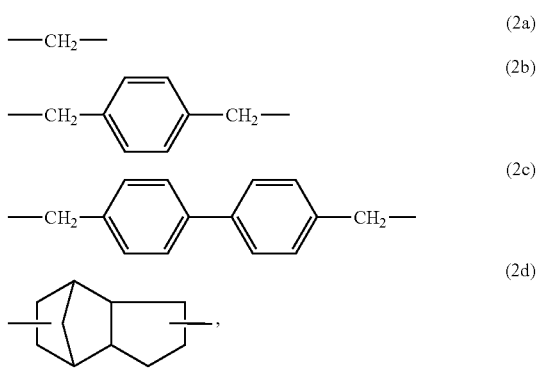

and in the formula (1b), $R^{17}$ represents an alkyl group having 4 or more carbon atoms, $R^{18}$ represents a hydrogen atom or an alkyl group, m is 0 or an integer of 1-10, and p is 0 or an integer of 1-2].

* * * * *